(12) United States Patent
Li

(10) Patent No.: US 10,012,020 B2
(45) Date of Patent: Jul. 3, 2018

(54) BI-DIRECTIONAL CLUTCH WITH RETURN FEATURE

(71) Applicant: ZMC Metal Coating Inc., Woodbridge (CA)

(72) Inventor: Zhi Li, Richmond Hill (CA)

(73) Assignee: ZMC Metal Coating Inc., Woodbridge, Ontario (CA)

( * ) Notice: Subject to any disclaimer, the term of this patent is extended or adjusted under 35 U.S.C. 154(b) by 339 days.

(21) Appl. No.: 15/075,587

(22) Filed: Mar. 21, 2016

(65) Prior Publication Data

US 2016/0319596 A1 Nov. 3, 2016

Related U.S. Application Data

(60) Provisional application No. 62/210,117, filed on Aug. 26, 2015, provisional application No. 62/155,776, filed on May 1, 2015.

(51) Int. Cl.
| | |
|---|---|
| *E06B 9/42* | (2006.01) |
| *E06B 9/50* | (2006.01) |
| *E06B 9/78* | (2006.01) |
| *F16D 41/10* | (2006.01) |
| *F16D 43/02* | (2006.01) |

(52) U.S. Cl.
CPC .............. *E06B 9/42* (2013.01); *E06B 9/50* (2013.01); *E06B 9/78* (2013.01); *F16D 41/105* (2013.01); *F16D 43/02* (2013.01); *E06B 2009/785* (2013.01)

(58) Field of Classification Search
CPC ..... E06B 9/42; E06B 9/50; E06B 9/56; E06B 9/78; E06B 2009/785; F16D 41/105; F16D 43/02
See application file for complete search history.

(56) References Cited

U.S. PATENT DOCUMENTS

| 5,375,643 A | 12/1994 | Rude |
| 5,586,631 A * | 12/1996 | Benthin .................... E06B 9/50 160/297 |

(Continued)

FOREIGN PATENT DOCUMENTS

WO WO2014112837 A1 7/2014

OTHER PUBLICATIONS

Warner Electric, "Wrap Spring Clutches and Clutch/Brakes", Publication P-1310-WE, Oct. 2013), 44 pages.

*Primary Examiner* — Richard M Lorence

(74) *Attorney, Agent, or Firm* — Kinney & Lange, P.A.

(57) ABSTRACT

A clutch having a clutch housing and a drive sprocket coaxially and rotationally mounted about a drive housing that is coaxially mounted about a shaft portion. The clutch housing has one or more drive sprocket engaging members with a locked and an unlocked position. When locked the drive sprocket engaging members lock the drive sprocket to the drive housing. When unlocked the drive sprocket engaging members permit the drive sprocket to rotate independently from the. A return drive mechanism includes a tether, a tether base and a return spring. The tether has a first end secured to the tether base and a second end secured to the clutch housing. The clutch housing, tether base and return spring are axially aligned and coaxially mounted about the shaft portion to present an overall compact clutch structure to facilitate mounting in confined locations.

9 Claims, 17 Drawing Sheets

(56) References Cited

U.S. PATENT DOCUMENTS

| | | | |
|---|---|---|---|
| 6,142,211 A | 11/2000 | Judkins | |
| 7,128,126 B2 | 10/2006 | Smith et al. | |
| 7,578,334 B2 | 8/2009 | Smith et al. | |
| 7,665,507 B2 | 2/2010 | Naoki | |
| 7,836,937 B2 | 11/2010 | Anderson et al. | |
| 8,186,413 B2 | 5/2012 | Fujita et al. | |
| 8,356,653 B2 | 1/2013 | Fu-Lai et al. | |
| 8,556,059 B2* | 10/2013 | Ng | E06B 9/42 160/298 |
| 8,590,592 B2* | 11/2013 | Kim | E06B 9/56 160/320 |
| 8,844,605 B2 | 9/2014 | Ng | |
| 2004/0226663 A1 | 11/2004 | Smith et al. | |
| 2006/0272783 A1 | 12/2006 | Smith et al. | |
| 2009/0308547 A1 | 12/2009 | Kwak | |
| 2010/0065226 A1 | 3/2010 | Fraser et al. | |
| 2012/0048485 A1 | 3/2012 | Fu-Lai et al. | |
| 2015/0330144 A1* | 11/2015 | Jung | E06B 9/42 475/4 |

* cited by examiner

BI-DIRECTIONAL CLUTCH WITH RETURN FEATURE

CROSS-REFERENCE TO RELATED APPLICATION(S)

This application claims the benefit of U.S. Provisional Application No. 62/155,776, filed May 1, 2015 for "Bi-Directional Clutch with Return Feature" by Zhi Li, and U.S. Provisional Application No. 62/210,117, filed Aug. 26, 2015 for "Bi-Directional Clutch with Return Feature" by Zhi Li.

FIELD

This invention relates to bi-directional clutches, and in one embodiment to a bi-directional clutch with a return feature for use in association with a roller shade or roller blind.

BACKGROUND

Roller shades, or roller blinds as they are sometimes referred to, are commonly mounted on windows, doors and other structures for privacy, for aesthetic purposes, and for noise and light control. Most modern roller shades employ a clutch mechanism that permits the shade to be raised or lowered through pulling on one end of a looped chain or cord that is received around the clutch. The cord or chain typically engages the clutch mechanism, which in turn drives a roller, upon which blind fabric is received, in one direction or the other. Commonly, the clutch is also utilized to retain the roller tube in a locked position when a desired amount of fabric has been unrolled therefrom, or when the fabric has been returned fully to the roller tube.

While such clutch mechanisms have been widely used in both commercial and residential applications, they often present elongate loops of cord or chain that hang downwardly from the blind headrail. Often a chain clamp or tensioning device is mounted to the window frame or other structure adjacent to the blind in order to hold the chain in position against the window frame or wall structure and to help minimize the chance of the cord becoming entangled with individuals, pets or other objects. The cord or chain will also often include a breakaway or separation link that would cause the loop to become broken upon the application of a predetermined force.

The potential threat of strangulation through the loop of chain or cord becoming wrapped around the neck of an infant or small child has caused regulators to legislate the use of such cord guides, tensioning devices and/or breakaways. Although such devices can be effective in, first minimizing the likelihood of a cord becoming wrapped around the neck of an infant or small child, and secondly allowing the looped chain or cord to become broken to help prevent strangulation in such circumstances, the use of these additional components may require drilling or otherwise securing guides or tensioners to a window frame, etc. which increases the labour involved when installing a roller blind. The use of such guides, tensioners, or breakaways, further adds to the number of component parts of the blind and to overall cost.

SUMMARY

The invention therefore provides a clutch comprising a clutch base, said clutch base including a shaft portion; a drive housing coaxially and rotationally mounted about said shaft portion; a drive sprocket coaxially and rotationally mounted about said drive housing, said drive sprocket engagable with a chain or cord to impart rotational movement to said drive sprocket in either a first or second rotational direction; a clutch housing coaxially and rotationally mounted about said drive housing, said clutch housing including one or more drive sprocket engaging members, said drive sprocket engaging members having a locked and an unlocked configuration, when in their locked configuration said drive sprocket engaging members locking said drive sprocket to said drive housing thereby permitting said drive sprocket, said clutch housing and said drive housing to rotate in unison, when said drive sprocket engaging members in their unlocked configuration said drive sprocket permitted to rotate independently from said drive housing; and, a return drive mechanism, said return drive mechanism including a tether, a tether base and a return spring, said tether having a first end secured to said tether base and a second end secured to said clutch housing, wherein a portion of said tether is releasably receivable about said tether base such that when said tether is at least partially withdrawn from about said tether base said tether base and said return spring cause said tether to impart a force upon said clutch housing urging said clutch housing to rotate relative to said drive housing, said clutch housing, said tether base and said return spring axially aligned and coaxially mounted about said shaft portion to present an overall compact clutch structure to facilitate mounting in confined locations.

The invention also provides such a clutch where said return spring is a torsion spring having first and second ends, one of said first and second ends releasably engagable with said tether housing, the other of said first and second ends releasably engagable with said shaft portion.

In another aspect the invention provides a clutch comprising a clutch base, said clutch base including a shaft portion; a drive housing coaxially and rotationally mounted about said shaft portion; a drive sprocket coaxially and rotationally mounted about said drive housing, said drive sprocket engageable with a chain or cord to impart rotational movement to said drive sprocket in either a first or second rotational direction; a clutch housing coaxially and rotationally mounted about said drive housing, said clutch housing including one or more drive sprocket engaging members, when said clutch in a rest configuration with no force applied to said drive sprocket by said chain or cord said one or more drive sprocket engaging members in an unlocked configuration permitting independent rotation of said drive sprocket relative to said drive housing, upon the application of a rotational force to said drive sprocket in one of said first or second directions by said chain or cord said one or more drive sprocket engaging members moving to a locked configuration thereby locking said drive sprocket to said drive housing and permitting said drive sprocket, said clutch housing and said drive housing to rotate in unison; and, a return drive mechanism, said return drive mechanism including a tether, a tether base and a return spring, said tether having a first end secured to said tether base and a second end secured to said clutch housing, a portion of said tether releasably receivable about said tether base, said return spring comprising a torsion spring having a first end engageable with said shaft portion and a second end engageable with said tether base such that the withdrawal of said tether from said tether base compresses or energizes said return spring causing said tether to apply a rotational force to said clutch housing, said drive sprocket, said clutch housing, said tether base and said return spring axially aligned and coaxially mounted about said shaft portion to present an overall compact clutch structure to facilitate mounting in confined locations.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 2:
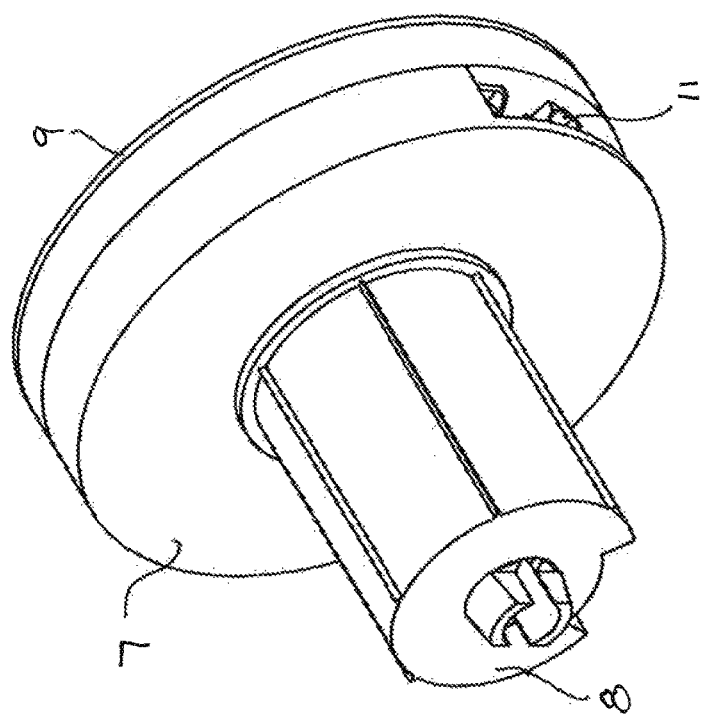
FIG. 2 is an upper side perspective view of the clutch shown in FIG. 1.
Figure 3:
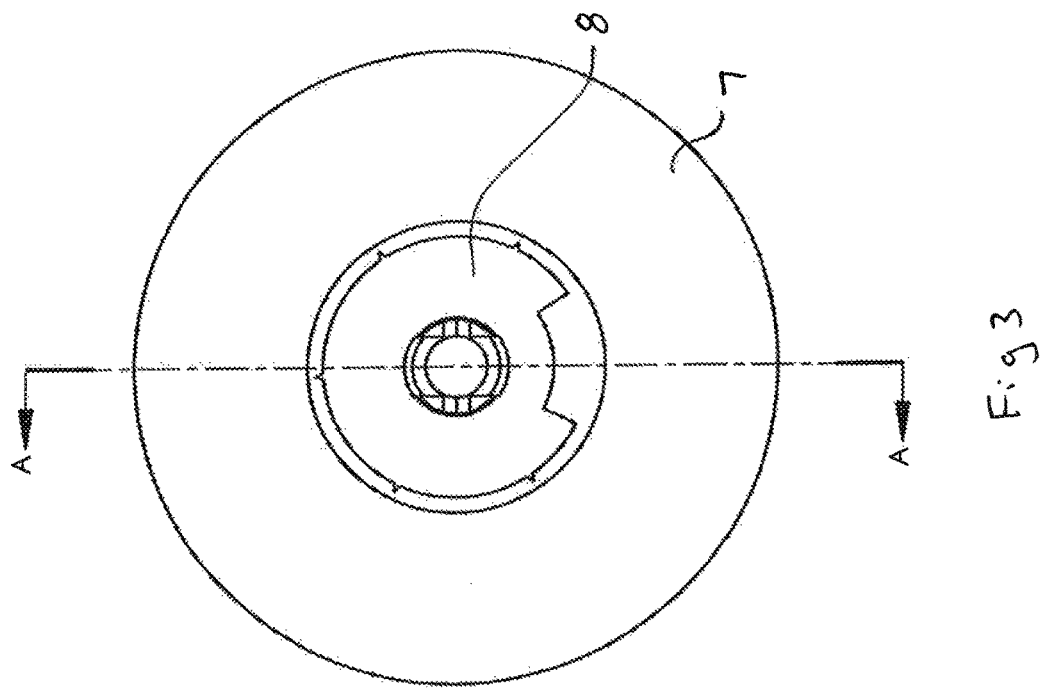
FIG. 3 is a left end view of the clutch shown in FIG. 2.

In the attached drawings there is shown a clutch, identified generally by reference numeral 1, constructed in accordance with a preferred embodiment of the invention. In the particular embodiment depicted, clutch 1 is used in association with a roller blind or roller shade 2 having blind fabric 3 received upon a roller 4. Roller 4 would typically be supported by a pair of end brackets 5. Commonly, one of the end brackets would receive clutch 1 with the opposite end bracket receiving an idle end 6. In this embodiment, clutch 1 is activated by a chain or cord 15. An enlarged view of the clutch is shown in FIGS. 2 and 3. Here, it will be seen that the exterior of the assembled clutch is largely formed by a clutch cover 7, a roller tube drive housing 8, and a back plate 9.

Figure 1:
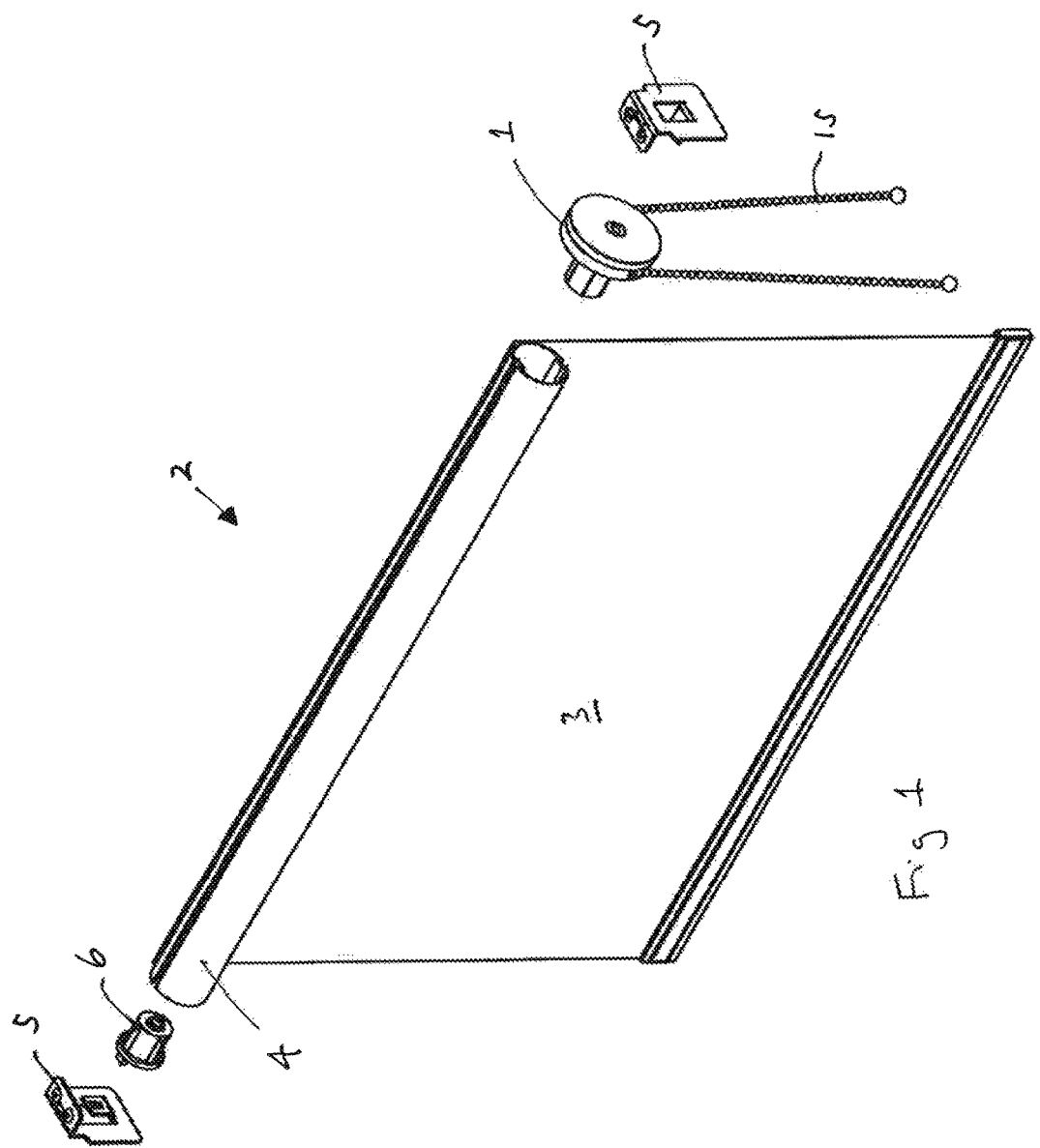
FIG. 1 is a side elevational view of a typical roller shade employing a clutch constructed in accordance with an embodiment of the present invention.
Figure 4:
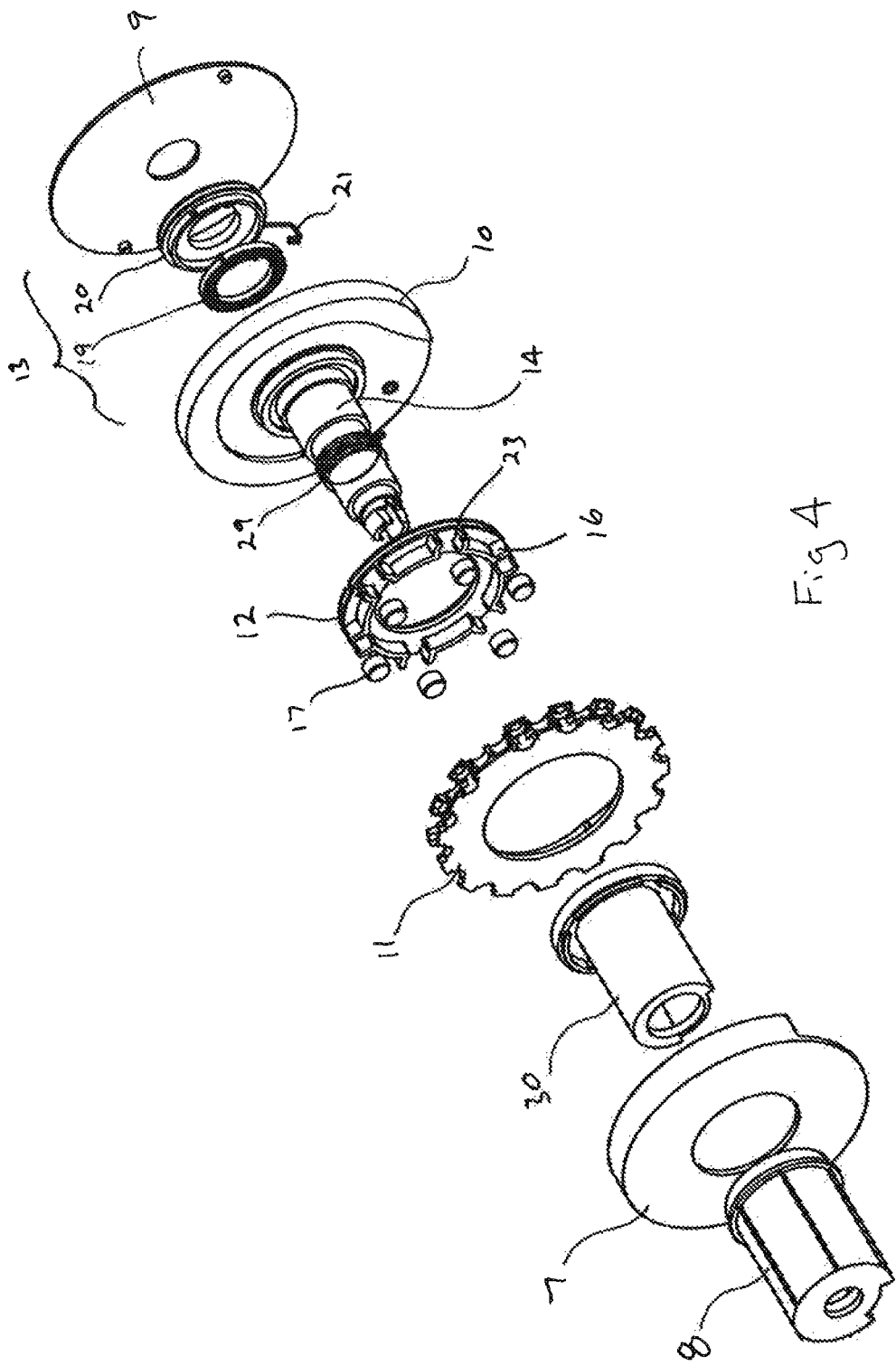
FIG. 4 is an exploded view of the clutch of FIG. 2.

With reference to FIG. 4, clutch 1 is shown as comprising, in general, a clutch base 10, a drive sprocket 11, a clutch housing 12, a drive housing 30, and a return drive mechanism 13. Clutch base 10 includes a shaft portion 14. Drive housing 30 is coaxially and rotationally mounted about clutch base 10, and in particular shaft portion 14. Drive sprocket 11 is coaxially and rotationally mounted about drive housing 30, and is engageable with chain or cord 15 (shown in FIG. 1) in order to drive the sprocket in either a first or a second rotational direction about drive housing 30. Like drive sprocket 11, clutch housing 12 is also coaxially and rotationally mounted about drive housing 30.

Clutch housing 12 includes one or more drive sprocket engaging members 16. In the particular embodiment shown in the attached drawings, drive sprocket engaging members 16 comprise rollers 17 that are retained within the clutch housing by opposed pairs of fingers 18 that form a pocket therebetween for receiving rollers 17. It will be appreciated from a thorough understanding of the invention that sprocket engaging members 16 (in this instance rollers 17) have a locked and an unlocked configuration. When they are in their locked configuration the sprocket engaging members effectively fix or lock drive sprocket 11, clutch housing 12 and drive housing 30 together such that the drive sprocket, clutch housing and drive housing rotate in unison. When the sprocket engaging members are in their unlocked configuration they no longer fix or engage the drive sprocket and the clutch housing to the drive housing, thereby permitting the clutch housing and drive sprocket to be rotated independently from the drive housing.

With particular reference to FIGS. 4, 5, 6A and 6B, in the embodiment depicted, return drive mechanism 13 is comprised generally of a return spring 19, a tether base 20, and a tether 21. In the particular embodiment shown, return spring 19 is a torsion spring that is coaxially mounted about shaft portion 14. It is expected that in most instances tether 21 will be comprised of a string or cord-like material having a relatively low degree of stretch. It will, however, be appreciated that other forms of tethers may equally be used. One end of the tether will be secured to tether base 20 with the other end secured to clutch housing 12. Both the tether base and the clutch housing preferably include a circumferential groove (22 and 23 respectively) upon which a portion of tether 21 can be wound and unwound. In the particular configuration of the clutch shown in the attached drawings, tether 21 extends it through a hole or opening 24 in clutch base 10. To reduce friction between the clutch base and the tether as the tether moves through hole 24, the hole may have incorporated into it a bushing or grommet. Both return spring 19 and tether base 20 are coaxially mounted about shaft portion 14 and, in the embodiment depicted in the attached drawings, received within an opening in the rear surface of clutch base 10. Return spring 19 and tether base 20 are thus confined between the clutch base and back plate 9 when the clutch is fully assembled in order to present an overall compact assembly. A compact clutch structure is more readily received within the headrail of the blind and does not present an obstacle to the mounting of more than one roller within the headrail, both of which can be problematic when using existing clutches. It is also expected that in many instances the unique compact nature of the described clutch structure may permit the said clutch to be substituted for the clutches in existing and pre-installed window blinds.

Figure 5:
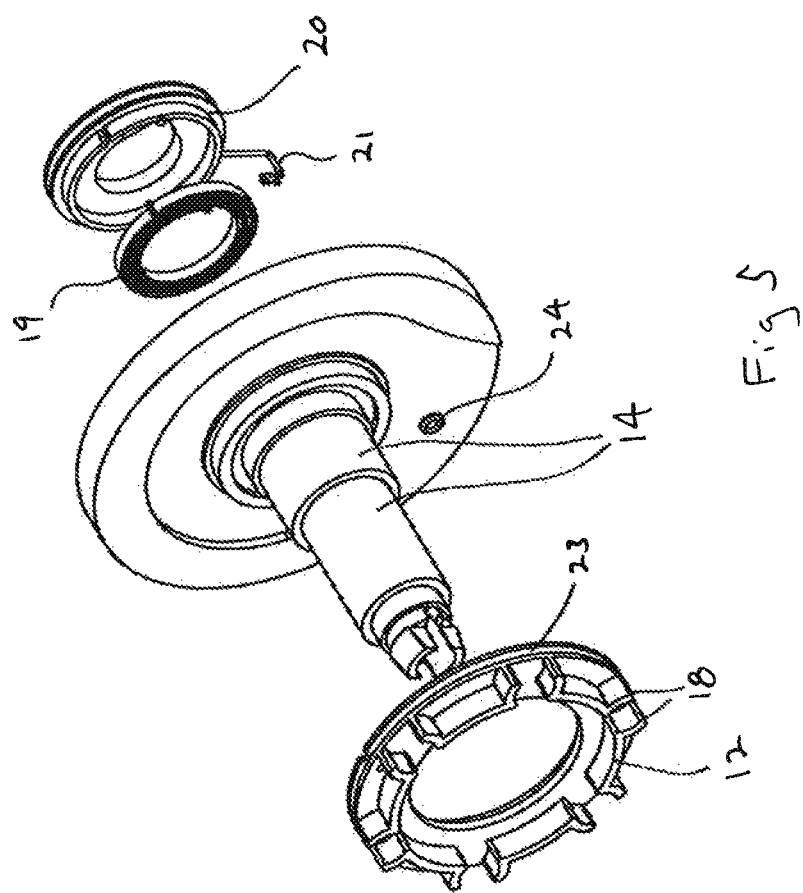
FIG. 5 is an exploded view of the return mechanism of the clutch of FIG. 2.
Figure 6:
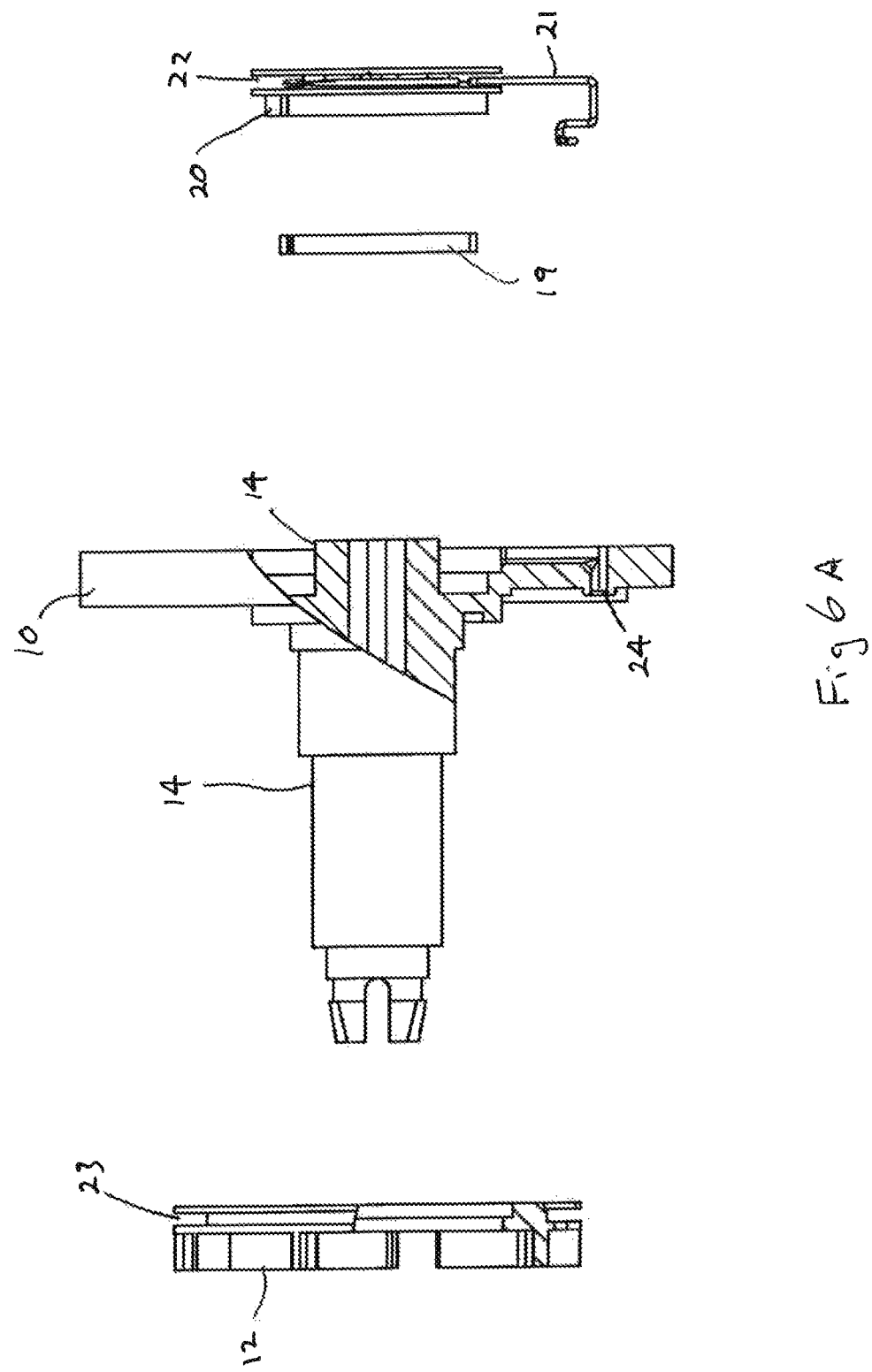
FIG. 6A is a side view, in partial section, of the exploded view shown in FIG. 5.
FIG. 6B is a view similar to FIG. 6A showing the tether having one end attached to the tether base and one end attached to the clutch housing.
Figure 7:
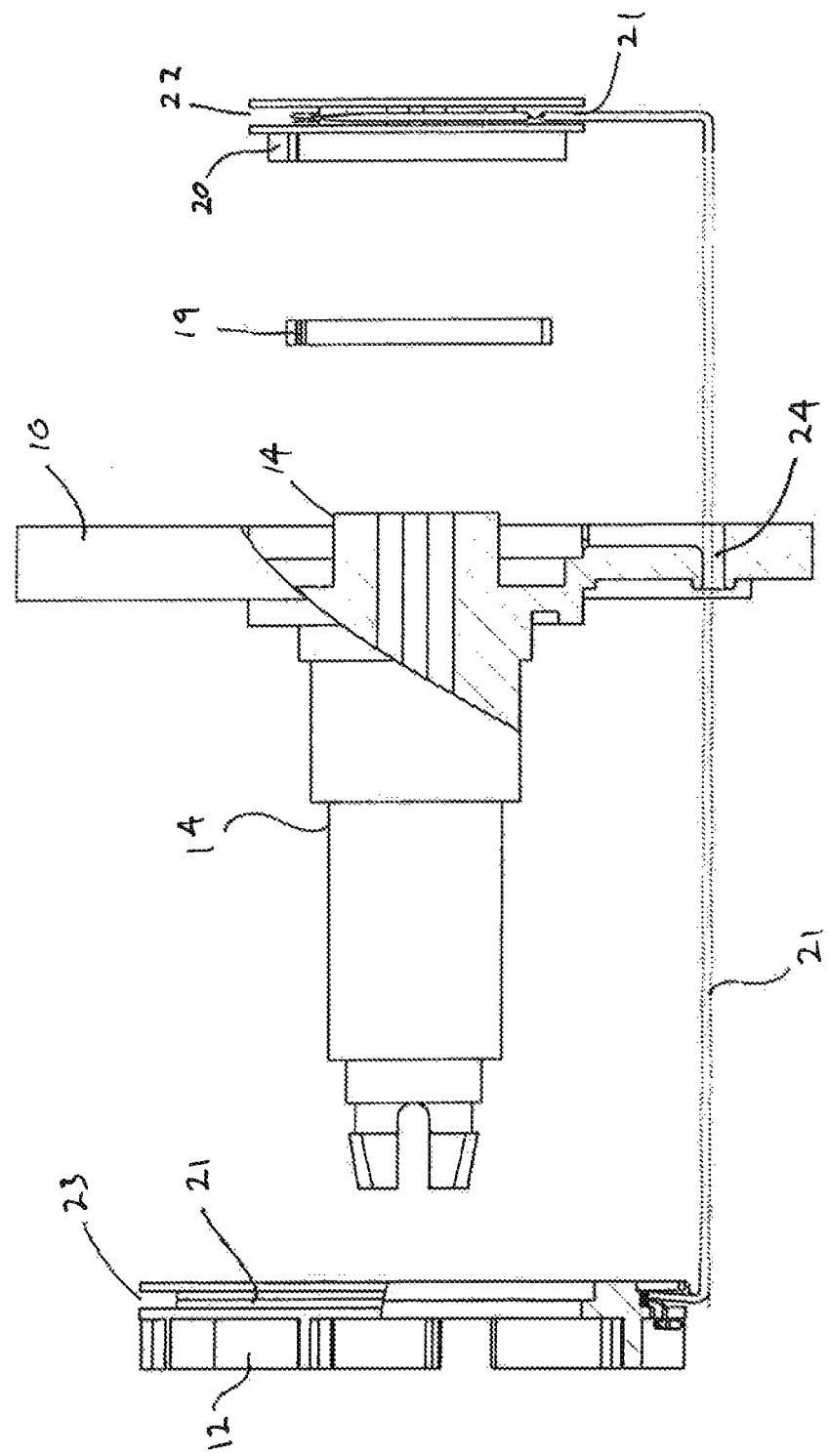
FIG. 7 is a sectional view taken along the A-A of FIG. 3.
Figure 8:
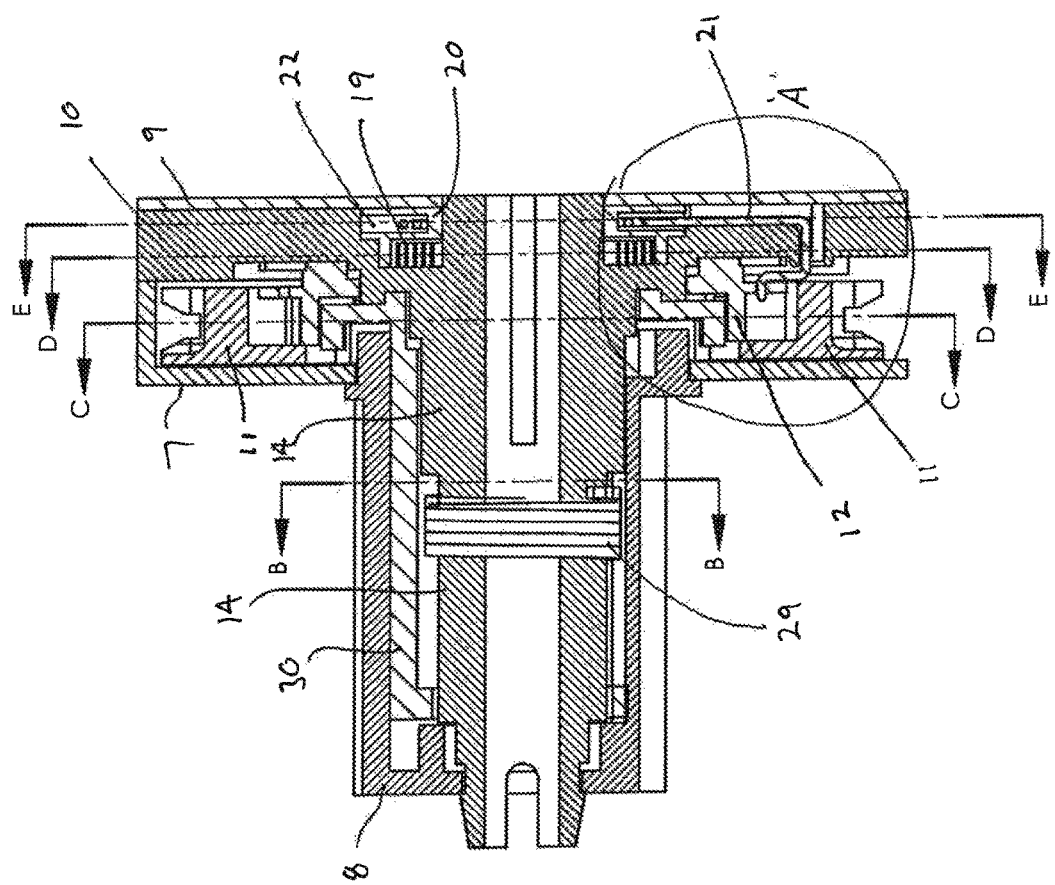
FIG. 8 is a sectional view taken along the line B-B of FIG. 7.
Figure 11:
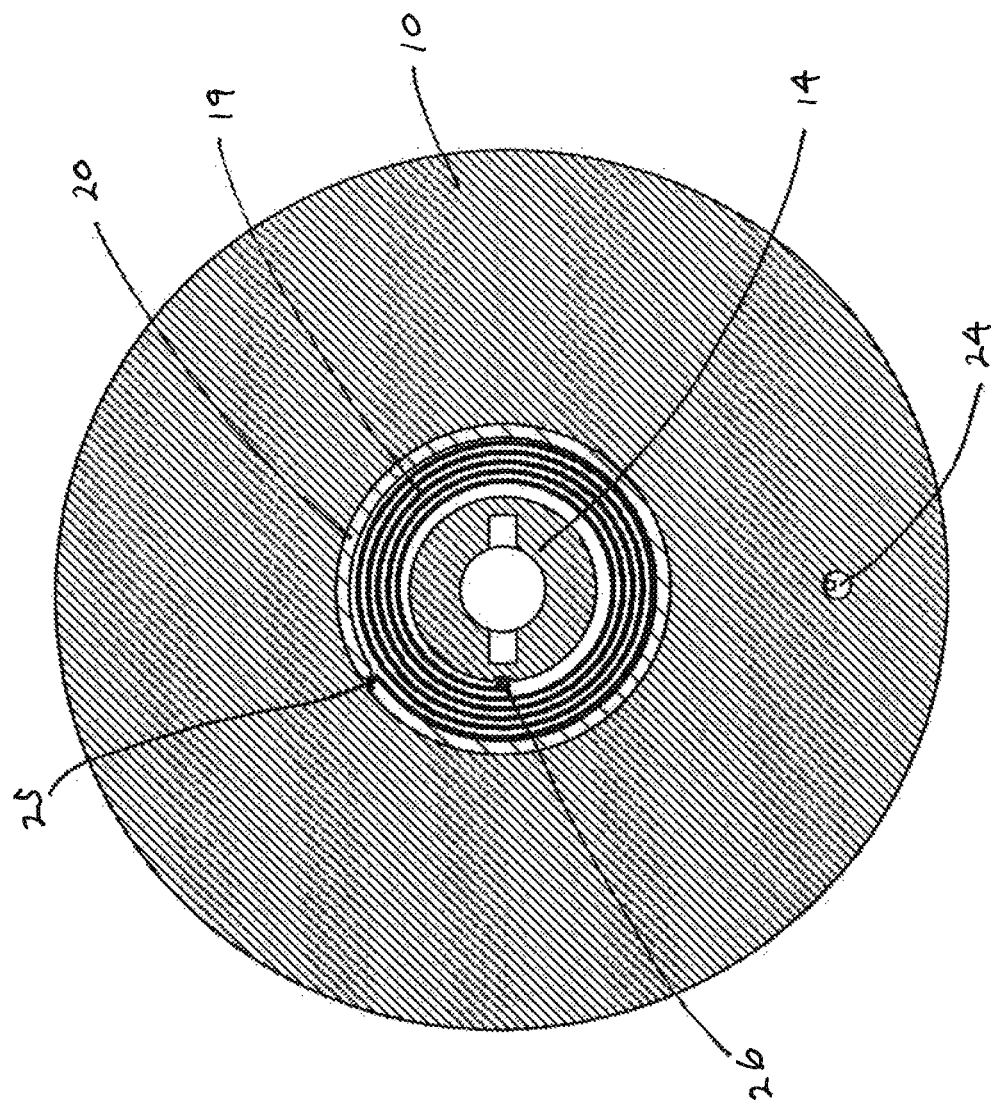
FIG. 11 is a sectional view taken along the line D-D of FIG. 7.
Figure 12:
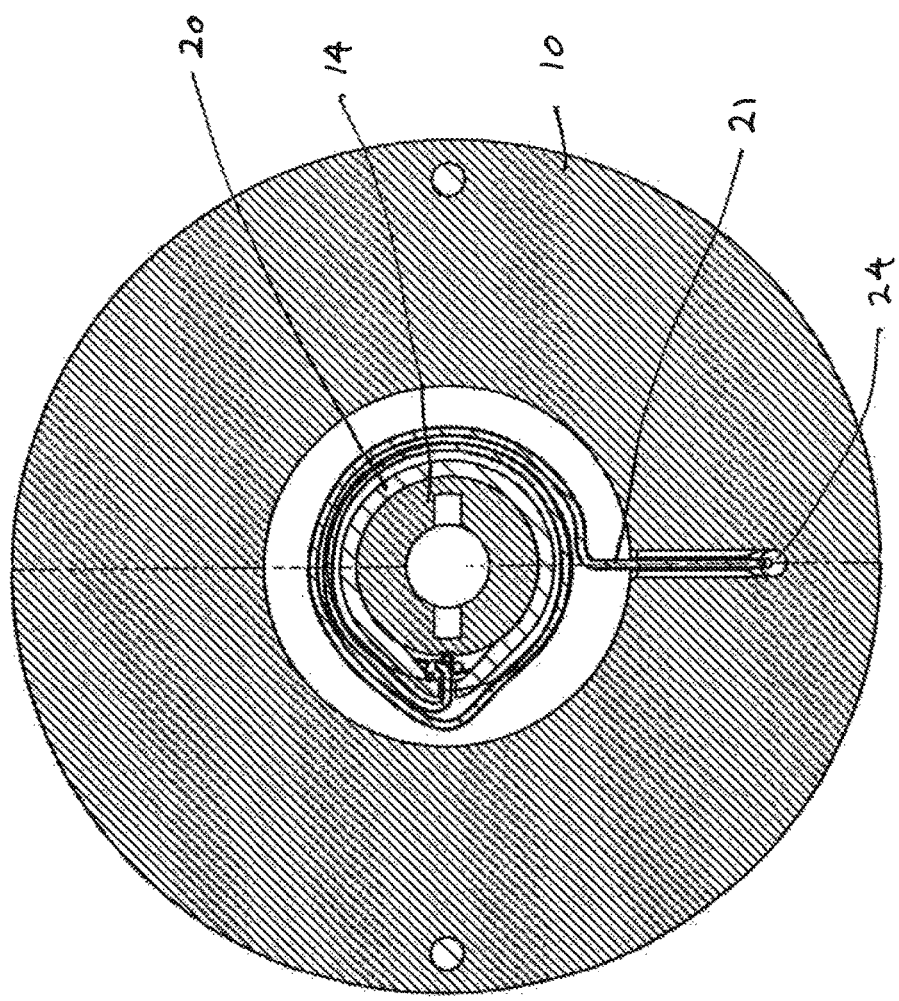
FIG. 12 is a sectional view taken along the line E-E of FIG. 7.
Figure 13:
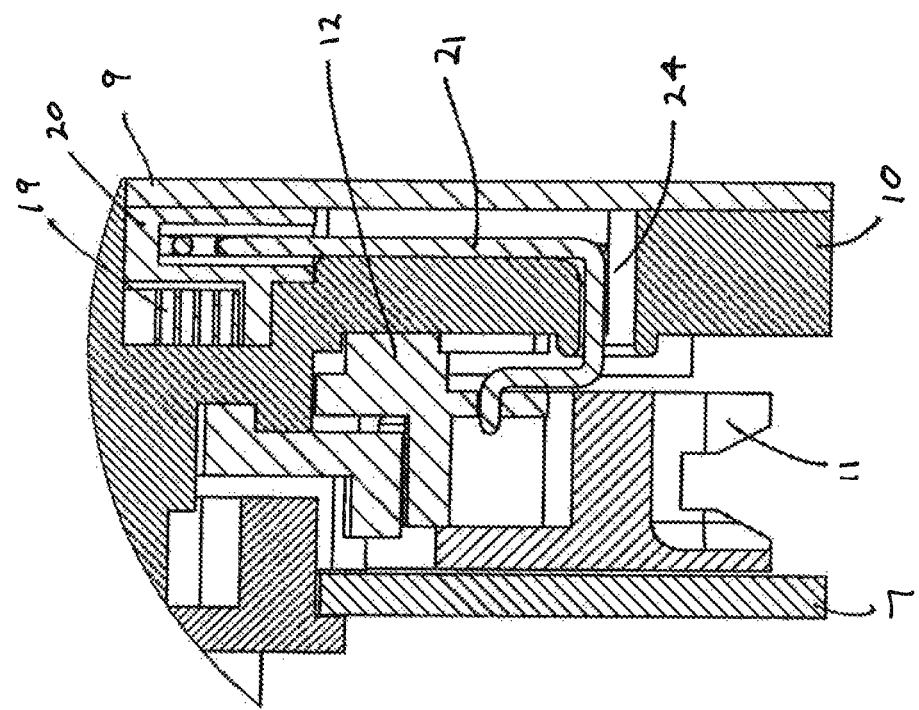
FIG. 13 is an enlarged detail of portion "A" of FIG. 7.
Figure 14:
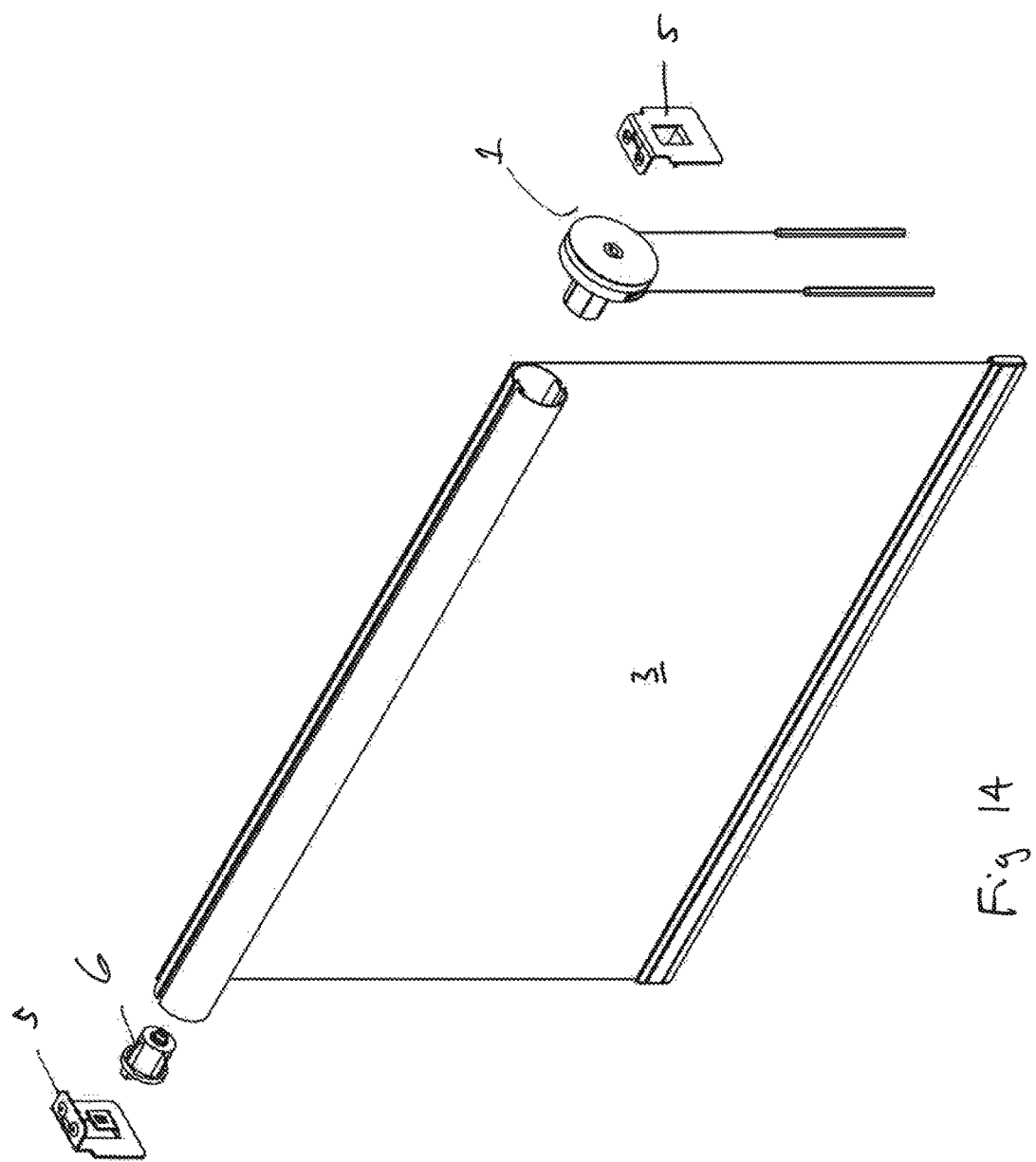
FIG. 14 is a partially exploded side elevational view of an embodiment of the roller shade shown in FIG. 1.
Figure 15:
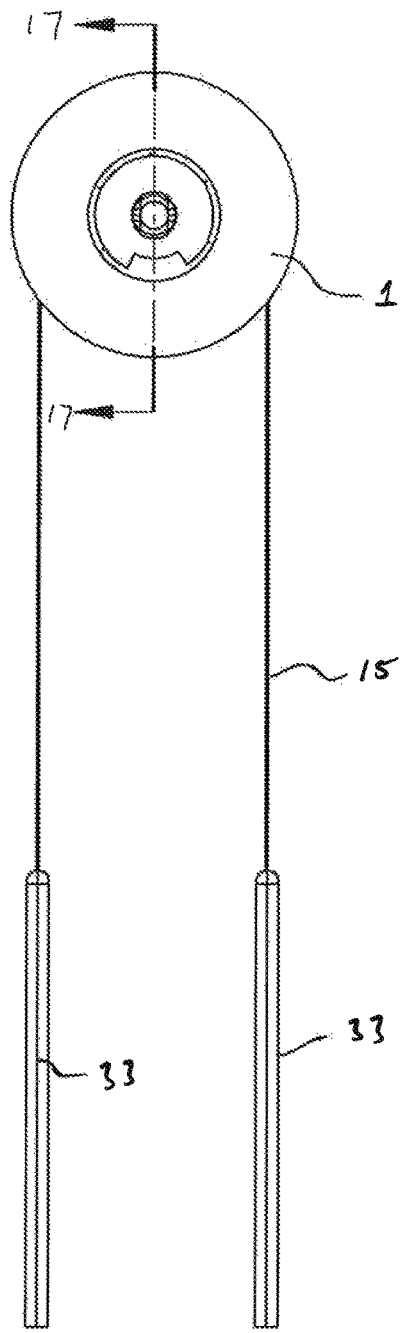
FIG. 15 is an end view of the clutch of the roller shade in FIG. 14.
Figure 16:
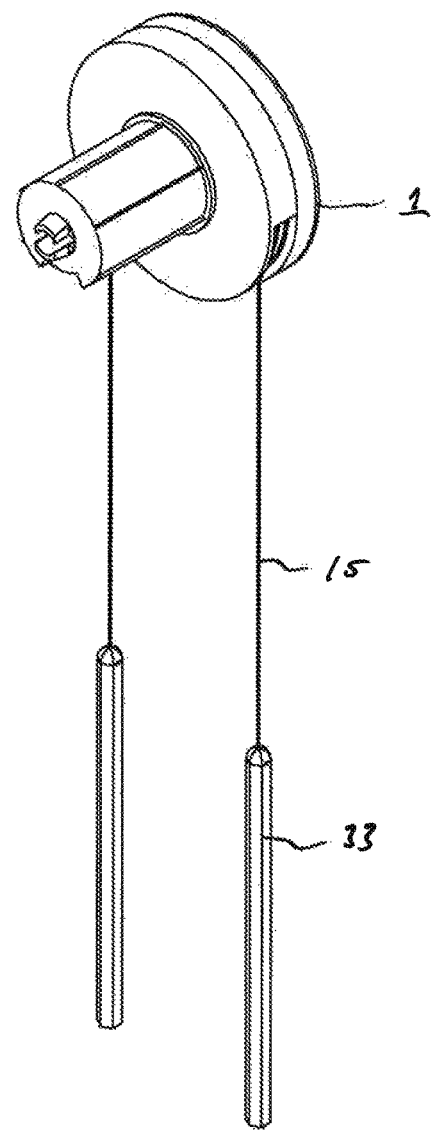
FIG. 16 is an upper side perspective view of the clutch shown in FIG. 15.
Figure 17:
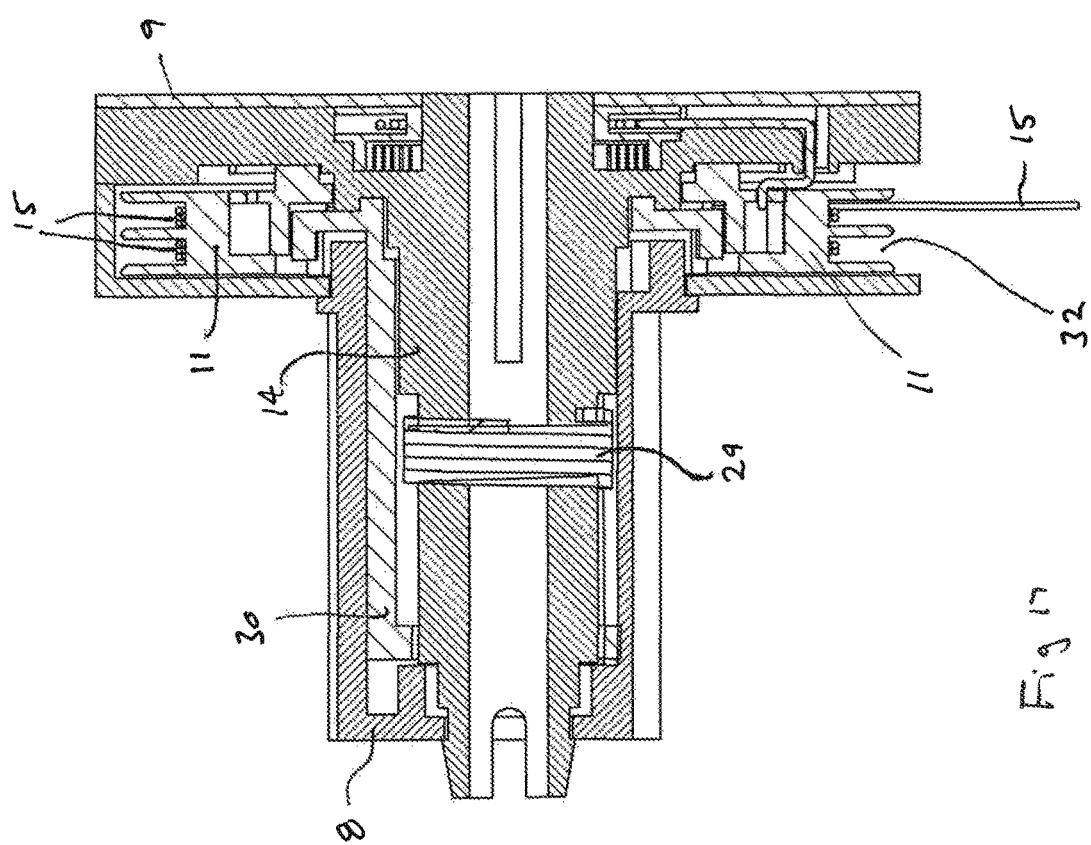
FIG. 17 is a sectional view taken along the line 17-17 of FIG. 15.
Figure 18:
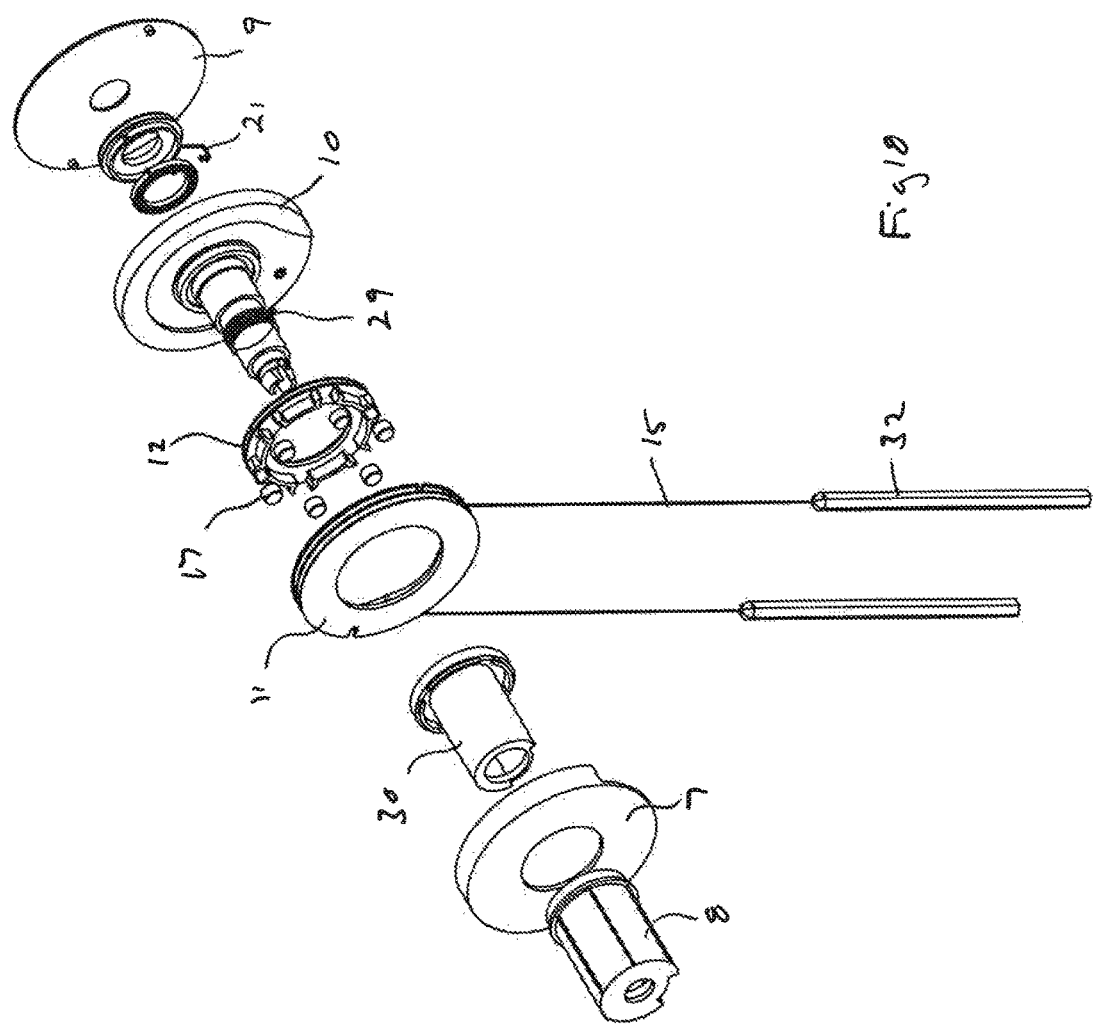
FIG. 18 is an exploded view of the clutch shown in FIG. 16.
Figure 19:
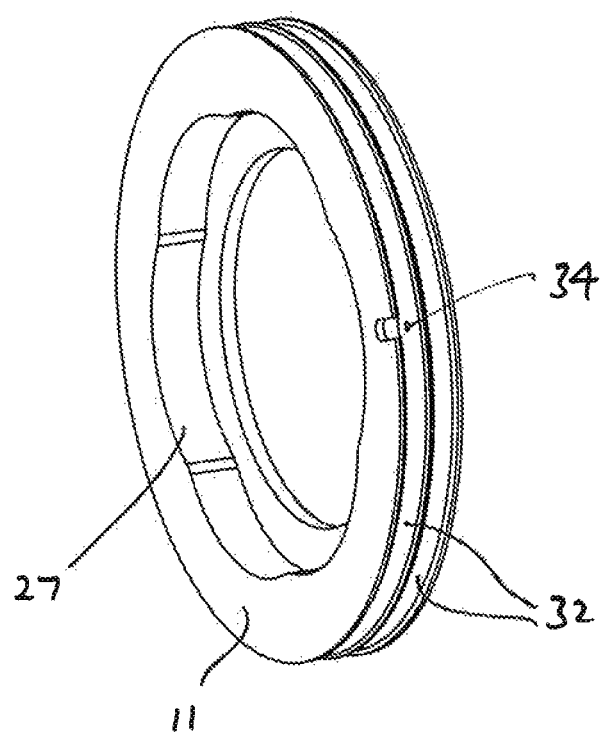
FIG. 19 is a side perspective view of the drive sprocket of the clutch shown in FIG. 18.

With reference to FIGS. 5 and 11, return spring 19 includes a first, front or leading end 25 and a second, rear or trailing end 26. First end 25 engages tether base 20 while second end 26 engages clutch base 10. In this manner, since both return spring 19 and tether base 20 are axially mounted about shaft portion 14, and with one end of tether 21 secured to tether base 20 a portion of the tether received around the circumference of the tether base within groove 22, the pulling or withdrawal of tether 21 from about the tether base will result in a "compression" (or "energizing" or "activation") of return spring 19. It will also be appreciated that with the opposite end of tether 21 passing through hole 24 and secured to clutch housing 12, the compression or energizing of return spring 19 will cause the tether to apply a rotational force to clutch housing 12, urging the clutch housing to rotate about drive housing 30. From a rest position, rotation of clutch housing 12 will thus cause tether 21 to be withdrawn from tether base 20 and deposited within groove 23 on clutch housing 12. As the tether is withdrawn from tether base 20, return spring 19 will be compressed or loaded (energized). Once the rotational force applied to the clutch housing is removed, return spring 19, through its engagement with both shaft portion 14 and tether base 20, will cause a rotation of tether base 20 about shaft portion 14, thereby withdrawing the tether from groove 23 in clutch housing 12 and re-depositing tether 21 within groove 22 on tether base 20. The result of that action will be to rotate clutch housing 12 in an opposite direction to that which caused a withdrawal of tether 21 from the tether base 20.

Figure 9:
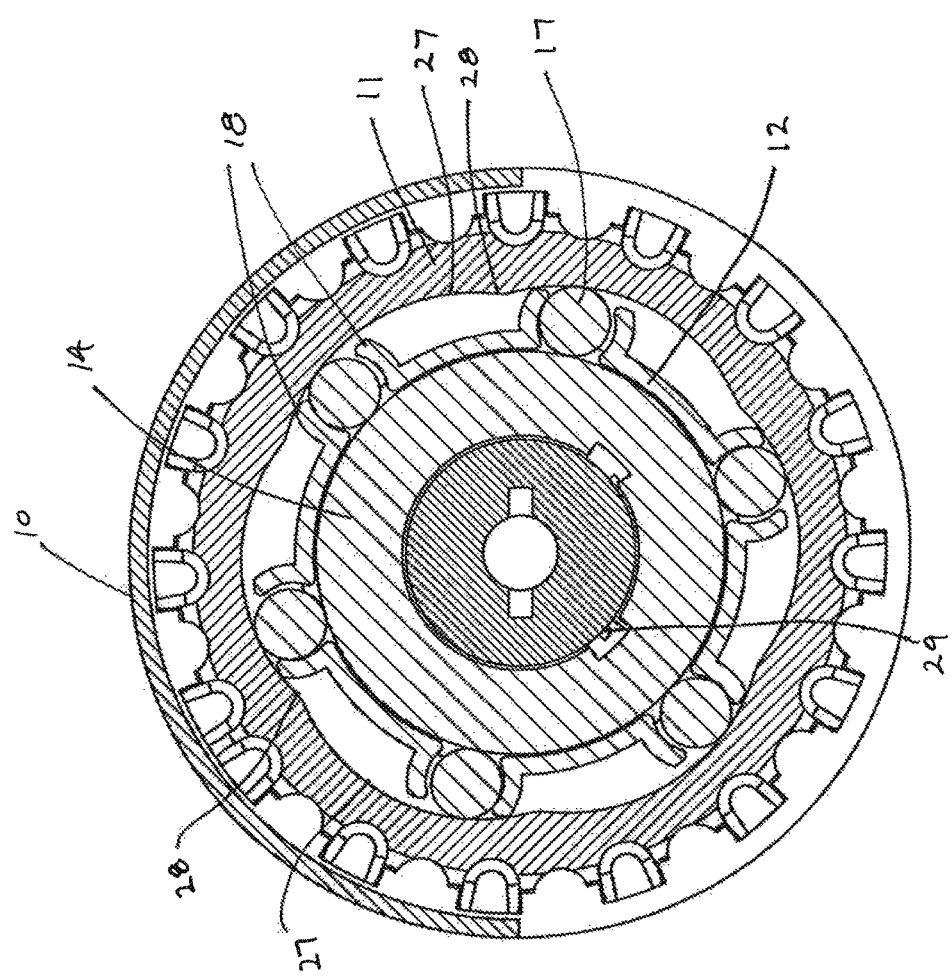
FIG. 9 is a sectional view taken along the line C-C of FIG. 7 wherein the sprocket is being rotated by a chain or cord in a clockwise direction as shown by the arrow in the figure.
Figure 10:
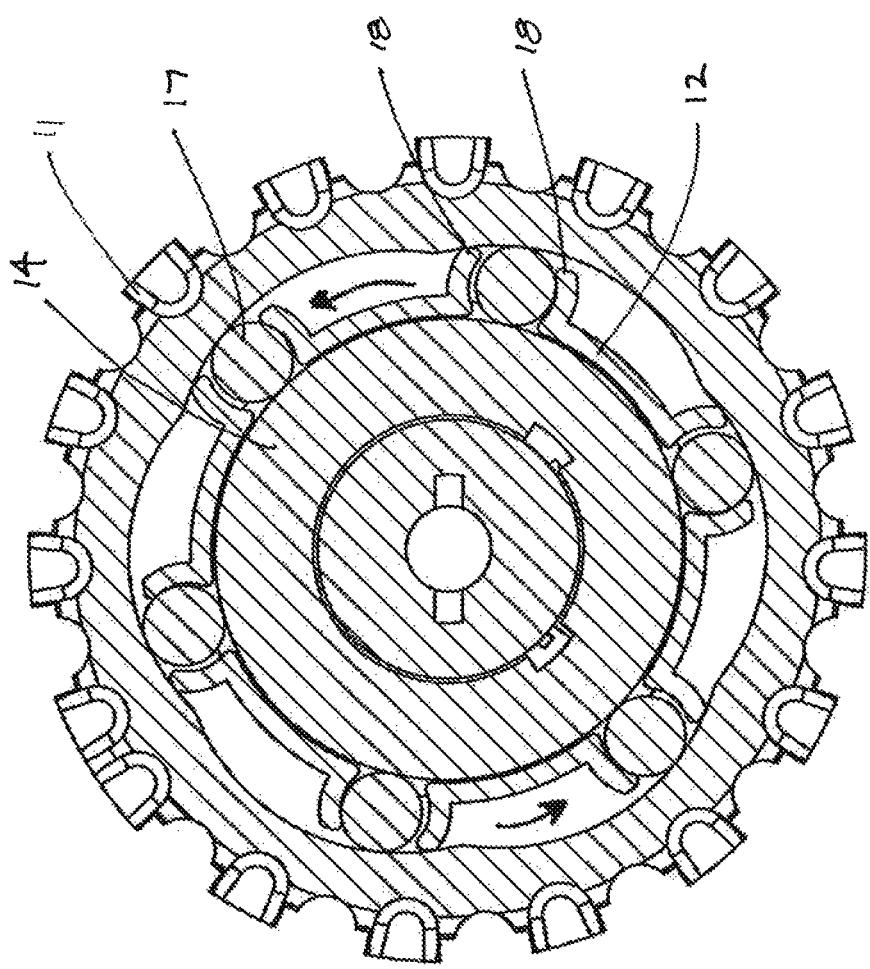
FIG. 10 is a sectional view similar to that shown in FIG. 9 wherein the roller housing is being rotated in a counter-clockwise direction as shown by the arrow in the figure.

Having in regard the description above, and considering the attached drawings, one of ordinary skill will appreciate that when clutch 1 is in a rest position (ie no application of force to the drive sprocket by the cord or chain) the application of tension to one end of chain or cord 15 will impart a rotational force to drive sprocket 11 (in either a clockwise or counter-clockwise direction depending on which of the two ends of the chain are tensioned). As drive sprocket 11 is rotated its inner surface 27 in many instances will initially slide along the outer surface of rollers 17 of clutch housing 12. As shown in FIGS. 4, 9 and 10, inner surface 27 of drive sprocket 11 includes reduced diameter portions 28 (bumps or cammed-type surfaces) that come into contact with the exterior of rollers 17 as the drive sprocket is rotated. As further rotational force is applied to drive sprocket 11 rollers 17 will be compressed between the interior surface of the drive sprocket and the exterior surface of drive housing 30, to the point where drive sprocket 11 and clutch housing 12 effectively become "locked" with drive housing 30. That is, the frictional contact between rollers 17 and the inner surface 27 of drive sprocket 11, and the frictional contact between rollers 17 and the exterior of drive housing 30, will be such that the drive sprocket, the clutch housing and the drive housing effectively rotate in unison as a single component. FIG. 9 shows rotation (clockwise in this figure) of drive sprocket 11 to the point where it becomes "locked" through the compression of rollers 17 between reduced diameter portion 28 and the outer surface of drive housing 30 (such that all three of the drive sprocket, the clutch housing and the drive housing will rotate together). In this particular instance clutch housing 12 will essentially be carried rotationally along with the drive sprocket and the drive housing through the interaction of rollers 17 with one of fingers 18. It will be appreciated that an increase in the rotational force applied to the drive sprocket by chain or cord 15 only serves to enhance the above mentioned frictional contact. In addition, once drive sprocket 11, clutch housing 12 and drive housing 30 become "locked" together, further tension applied to the chain or cord 15 will effectively cause rotation of drive housing 30, much as is the case in a conventional clutch.

With particular reference to FIGS. 2, 3 and 4, clutch 1 may include traditional (spring wrap) clutch elements that are present in conventional clutches used for lowering and raising roller blinds. Commonly, those conventional slip clutch elements would include a clutch spring 29 that co-operates with drive housing 30. Conventional clutches will often also include clutch cover 7 and roller tube drive housing 8. It will be appreciated by those skilled in the art that when drive sprocket 11, clutch housing 12 and drive housing 30 are effectively "locked" together as described above, drive sprocket 11, drive housing 30, clutch spring 29, clutch spring opening housing 30 and roller tube drive housing 8 will effectively operate as a conventional slip clutch for opening or closing the roller blind. Those skilled in the art will readily understand the operation of such clutches, such as that described in U.S. Pat. No. 8,556,059, the contents of which are incorporated herein by reference.

It will also be appreciated that when drive sprocket 11, clutch housing 12 and drive housing 30 are rotating in unison, the rotation of the clutch housing will have the effect of withdrawing tether 21 from tether base 20 and depositing a portion of the tether within groove 23 on clutch housing 12. As described above, as tether 21 is withdrawn from tether base 20 return spring 19 will become "compressed" or "energized", effectively applying a force to tether base 20 that attempts to withdraw the tether from groove 23 on clutch housing 12 and return it to groove 22 on tether base 20. When the tension applied to chain or cord 15 is released, return spring 19 will cause tether base 20 to rotate so as to withdraw tether 21 from groove 23 on clutch housing 12 and re-deposit tether 21 back into groove 22 on tether base 20. In so doing clutch housing 12 will be rotated in a direction "opposite" to that that in which it was driven when tension was being applied to chain or cord 15 causing the initial rotation of drive sprocket 11. It will be understood that the relative direction of rotation of tether base 20 will depend on the direction of rotation of the coils of return spring 19 and which of the ends of the spring engage tether base 20 and shaft portion 14, respectively. It will also be understood that the relative direction of rotation of tether base 20 will be independent of the direction of rotation of drive sprocket 11 and clutch housing 12.

The above movement causes clutch housing 12 to rotate about drive housing 30 in the above mentioned "opposite" direction, such that rollers 17 effectively "carry" with them drive sprocket 11 causing the drive sprocket to be rotated backwardly (ie in the said "opposite" direction) as the drive sprocket becomes "unlocked" from drive housing 30. That is, return drive mechanism 13, in conjunction with clutch housing 12, rollers 17 and drive sprocket 11, effectively allows for drive sprocket 11 to be de-coupled from drive housing 30, permitting drive sprocket 11 to be rotated backwardly while the roller blind otherwise remains stationary.

FIG. 10 depicts such movement. Here the tension applied to chain or cord 15 has been removed and the tether causes clutch housing 12 to be urged in the said "opposite" direction (counter-clockwise in this instance as show by the arrow in FIG. 10). With the removal of the force applied by the chain or cord to the drive sprocket, and with the reversal of the direction of rotation of clutch housing 12, the compression of rollers 17 between interior surface 27 and the exterior of drive housing 30 will be minimized or eliminated. Rotation of the clutch housing in the "opposite" direction results in one of fingers 18 in each finger pair engaging a respective roller 17 and "carrying" the roller rotationally in the same (again in this instance counter-clockwise) direction. Rollers 17 then act upon inner surface 27 of drive sprocket 11 to cause the drive sprocket to also be rotated in the same "opposite" (here counter-clockwise) direction. Without a significant compression force being applied to rollers 17 their inner surfaces will slip or "roll" along the exterior surface of drive housing 30, resulting in the drive housing remaining stationary. Once the tether has been replaced back upon the tether base and return spring 19 is "de-energized", the clutch will again be in a rest position, permitting a subsequent force to be applied to chain or cord 15 to apply a rotational force to drive sprocket 11, effectively causing the entire process to repeat itself.

As discussed above, and as will be appreciated, drive sprocket 11 can be rotated in its first or second rotational direction about drive housing 30 through use of a chain, cord or any one of a wide variety of other mechanical or electro-mechanical components or devices. Where the drive sprocket is rotated by a chain it will typically have about is circumferential surface a series of concave detents that generally match the size and shape of the beads of the chain, and that are generally spaced apart by a distance matching the space in between adjacent beads on the chain (for example see FIGS. 4 and 10). It will, however, also be appreciated that where drive sprocket 11 is rotated through the use of a cord (or pair of cords) the exterior circumferential surface of drive sprocket 11 will preferably include one or more channels 32 to receive the cord as it is wound about the drive sprocket. FIGS. 14 through 19 illustrate, with more particularity, configuration of drive sprocket 11 when it is constructed specifically in accordance for use with a cord. If desired, the terminal ends of the cords hanging downwardly from the drive sprocket may be fitted with wands or handles 33 that provide added weight to help ensure that the cords hang vertically and that also to provide a means to easily grasp and pull the cords in a downward direction.

Where cords are utilized to rotate the drive sprocket, a pair of separate cords may be secured to the sprocket, each cord wound in an opposite direction about the sprocket circumference. One end of the cords will also be terminated or fixed to the sprocket (for example through insertion through a hole 34 and knotted, mechanically fastened, glued or otherwise fixed in place. Alternately, in other embodiments a single cord may be utilized wherein the cord is passed through hole 34 such that an approximate equal amount of the cord extends outwardly from each side of the hole, effectively creating two "legs" of cord. Thereafter each leg can be wound in an opposite direction about the circumference of the sprocket, and received within one of the channels 32. It will thus be appreciated that regardless whether two cords are used or a single cord wound in opposite directions, pulling on one end of the cord will cause drive sprocket 11 to rotate in a first direction, whereas pulling on the opposite end of the cord (or the end of the second cord) will cause drive sprocket 11 to rotate in an opposite direction. It will further be appreciated that aside from the utilization of one or two cords to rotate the drive sprocket, the clutch in FIGS. 14 through 19 will function the same as that shown in FIGS. 1 through 13.

It will be appreciated that the symmetry of clutch 1 is such that its function is essentially the same regardless of which leg of chain or cord 15 is tensioned and regardless of whether drive sprocket 11 is caused to rotate in a clockwise or counter-clockwise direction (for example when viewed from the perspective of FIG. 4). In either instance, the operation of clutch housing 12, return spring 19 and tether base 20 will be the same, with the primary difference being the direction that tether 21 is wound upon clutch housing 12 and received within groove 23.

There is thus presented a bi-directional clutch having a return feature that permits the raising and lowering of a roller blind or shade through the successive application of tension to one of the legs of a chain or cord received around drive sprocket 11. The application of tension to the leg of the chain or cord will be successive, in each instance allowing return drive mechanism 13 to function in order to reverse the rotation of the clutch housing and the drive sprocket while the roller blind remains in its current state of deployment. That is, the described structure permits drive sprocket 11 to be selectively engaged and disengaged from drive housing 30 to permit a "ratchet" type of movement to roller tube drive housing 8. In this manner the blind may be deployed or retracted without the use of a continuous loop of chain or cord, thereby removing the danger and potential choking hazard that would otherwise be present. There is also eliminated the need for the use of a breakaway joining together the two ends of the chain or cord. In many instances the need for chain or cord guides or tensioners is also eliminated or reduced. The mounting of tether base 20 and return spring 19 coaxially about shaft portion 24 further permits clutch 1 to be constructed in a manner that presents a compact and low profile product. A compact and low profile clutch may be advantageous as it can be easily and readily received within traditional headrails, while at the same time leaving sufficient space within the headrail for the mounting of multiple roller tubes if desired.

It is to be understood that what has been described are the preferred embodiments of the invention. The scope of the claims should not be limited by the preferred embodiments set forth above, but should be given the broadest interpretation consistent with the description as a whole.

I claim:

1. A clutch comprising:
   a clutch base, said clutch base including a shaft portion;
   a drive housing coaxially and rotationally mounted about said shaft portion;
   a drive sprocket coaxially and rotationally mounted about said drive housing, said drive sprocket engagable with a chain or cord wherein the application of tension to said chain or cord imparts rotational movement to said drive sprocket in either a first or second rotational direction;
   a clutch housing coaxially and rotationally mounted about said drive housing, said clutch housing including one or more drive sprocket engaging members, said drive sprocket engaging members having a locked and an unlocked configuration, when in their locked configuration said drive sprocket engaging members locking said drive sprocket to said drive housing thereby permitting said drive sprocket, said clutch housing and said drive housing to rotate in unison, when said drive sprocket engaging members in their unlocked configuration said drive sprocket permitted to rotate independently from said drive housing; and,
   a return drive mechanism, said return drive mechanism including a tether, a tether base and a return spring, said tether having a first end secured to said tether base and a second end secured to said clutch housing, wherein a portion of said tether is releasably receivable about said tether base such that when said tether is at least partially withdrawn from about said tether base said tether base and said return spring cause said tether to impart a force upon said clutch housing urging said clutch housing to rotate relative to said drive housing, said clutch housing, said tether base and said return spring axially aligned and coaxially mounted about said shaft portion to present an overall compact clutch structure to facilitate mounting in confined locations.

2. The clutch as claimed in claim 1 wherein said drive sprocket engaging members comprise one or more rollers, said one or more rollers engagable by one or more reduced diameter portions on said drive sprocket such that rotation of said drive sprocket in one of said first and second directions causes said one or more reduced diameter portions to engage said one or more rollers to thereby lock said drive sprocket to said drive housing and permit said drive sprocket, said drive housing and said clutch housing to rotate in unison.

3. The clutch as claimed in claim 1 withdrawal of said tether from said tether base causes a compressing or energizing of said return spring thereby urging rotational movement of said clutch housing relative to said drive housing.

4. The clutch as claimed in claim 1 wherein said return spring is a torsion spring having first and second ends, one of said first and second ends releasably engagable with said tether housing, the other of said first and second ends releasably engagable with said shaft portion.

5. The clutch as claimed in claim 1 wherein said tether base and said clutch housing include radial grooves to accept said tether therein.

6. A clutch comprising:
   a clutch base, said clutch base including a shaft portion;
   a drive housing coaxially and rotationally mounted about said shaft portion;
   a drive sprocket coaxially and rotationally mounted about said drive housing, said drive sprocket engageable with a chain or cord wherein the application of tension to said chain or cord imparts rotational movement to said drive sprocket in either a first or second rotational direction;
   a clutch housing coaxially and rotationally mounted about said drive housing, said clutch housing including one or more drive sprocket engaging members, when said clutch in a rest configuration with no force applied to said drive sprocket by said chain or cord said one or more drive sprocket engaging members in an unlocked configuration permitting independent rotation of said drive sprocket relative to said drive housing, upon the application of a rotational force to said drive sprocket in one of said first or second directions said one or more drive sprocket engaging members moving to a locked configuration locking said drive sprocket to said drive housing and permitting said drive sprocket, said clutch housing and said drive housing to rotate in unison; and,
   a return drive mechanism, said return drive mechanism including a tether, a tether base and a return spring, said tether having a first end secured to said tether base and a second end secured to said clutch housing, a portion of said tether releasably receivable about said tether base, said return spring comprising a torsion spring having a first end engageable with said shaft portion and a second end engageable with said tether base such that the withdrawal of said tether from said tether base compresses or energizes said return spring causing said tether to apply a rotational force to said clutch housing,
   said drive sprocket, said clutch housing, said tether base and said return spring axially aligned and coaxially mounted about said shaft portion to present an overall compact clutch structure to facilitate mounting in confined locations.

7. The clutch as claimed in claim 6 wherein said one or more drive sprocket engaging members comprise one or more rollers, said one or more rollers engagable by one or more reduced diameter portions on said drive sprocket such that rotation of said drive sprocket in one of said first and second directions causes said one or more reduced diameter portions to engage said one or more rollers to lock said drive sprocket to said drive housing and permit said drive sprocket, said drive housing and said clutch housing to rotate in unison.

8. The clutch as claimed in claim 6 wherein the rotation of said drive sprocket, said clutch housing and said drive housing, in unison, upon the application of rotational force to said drive sprocket in one of said first and said second directions by said chain or cord, causes a withdrawal of said tether from said tether base and the energization of said return spring, upon the removal of said rotational force applied to said drive sprocket by said chain or cord said return spring causing said tether to apply a rotational force to said clutch housing in the other of said first and second directions thereby rotating said clutch housing and said drive sprocket in said other direction, independently of said drive housing.

9. The clutch as claimed in claim 6 wherein said tether base and said clutch housing include radial grooves to accept said tether therein.

* * * * *